United States Patent
Hendrickson

[15] 3,678,612
[45] July 25, 1972

[54] COLLAPSIBLE TRAP FOR CRUSTACEANS

[72] Inventor: Roger L. Hendrickson, Rte. 1, Bradshaw Road, Mt. Vernon, Wash. 98273

[22] Filed: May 28, 1970

[21] Appl. No.: 41,230

[52] U.S. Cl. .................................. 43/66, 43/100, 43/105
[51] Int. Cl. ................................................ A01k 69/08
[58] Field of Search ............ 43/66, 100, 105; 119/19, 55, 119/47; 6/4

[56] References Cited

UNITED STATES PATENTS

| | | | |
|---|---|---|---|
| 1,450,682 | 4/1915 | Keddy | 43/100 |
| 1,728,645 | 9/1929 | Ward et al. | 43/100 |
| 2,910,801 | 11/1959 | Safarik et al. | 43/105 |
| 1,146,698 | 7/1915 | Franklin | 43/66 |
| 2,760,297 | 8/1956 | Buyken | 43/105 |
| 855,175 | 5/1907 | Hershiser | 6/4 R |
| 713,756 | 11/1902 | Fawcett | 119/19 |

*Primary Examiner*—Lucie H. Laudenslager
*Attorney*—Ford E. Smith

[57] ABSTRACT

An assembly of panels, edge-hinged together, provides a collapsible cage having opposed mouth openings. Inside each mouth, a ramp panel defines an entry passage terminating at a restricted gullet which, preferably, is gated.

4 Claims, 11 Drawing Figures

Patented July 25, 1972

INVENTOR.
ROGER L. HENDRICKSON

BY Ford E. Smith

ATTORNEY

Patented July 25, 1972

INVENTOR.
ROGER L. HENDRICKSON
BY
Ford E. Smith
ATTORNEY

COLLAPSIBLE TRAP FOR CRUSTACEANS

SUMMARY OF THE INVENTION

Known crustacea traps are principally of two forms, non-collapsible and collapsible. The non-collapsible traps are bulky and inconvenient to store, transport, and use. Collapsible traps that are known are quite complicated in their construction, and generally require much manipulation of hinged linkages, panels, and latch members in erecting and in knocking down the structure. The main object of the present invention is the provision of a collapsible trap for crustaceans which is formed of very few parts; is simple and easy to erect and knock down; and is highly efficient in use.

According to this invention, a collapsible right rectangular cage is formed of a bottom panel having erect side panels at each edge, all superposed by a top panel. The side panels are hingedly joined at abutting edges to the top and bottom panels permitting movement transversely relative each other and together to be disposed in a substantially common plane. When erect, the cage has a pair of opposed mouths. Inside the cage at the mouths are ramp panels hinged to the bottom panel. When the ramp panels are inclined relative the top and bottom panels, two converging entry passages are provided, and a restricted gullet is defined at the terminus of each passage. Quick release means support the ramp panels in their inclined dispositions. One-way gate means, operable by entering crustaceans, are desireably located at the gullets. The inclined ramps also function to align and maintain the bottom, side, and top panels in right rectangular space-enclosing relation for use as a trap.

DESCRIPTION OF THE INVENTION

This trap is useful for the capture of numerous types of crustaceans, such as lobster, crayfish, crabs, and the like. In this disclosure, reference will be made to its use in the capture of Dungeness crab. Such limited use reference, however, is without intention of limiting the scope of this invention.

Figure 2:
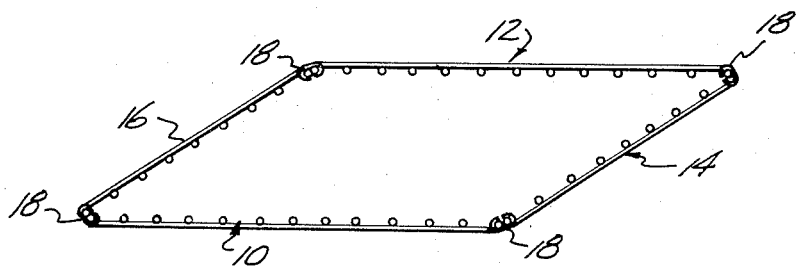
FIG. 2 schematically shows the movement of parts during knocking down and erection of the trap.
Figure 5:
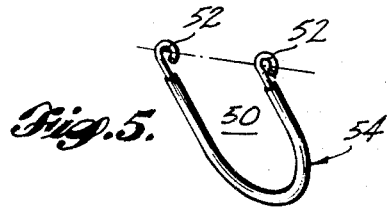
FIG. 5 shows a gate member.
Figure 3:
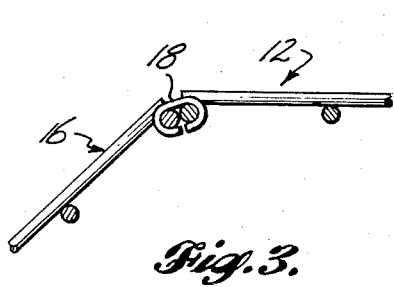
FIG. 3 shows a typical hinge coupling.
Figure 4:
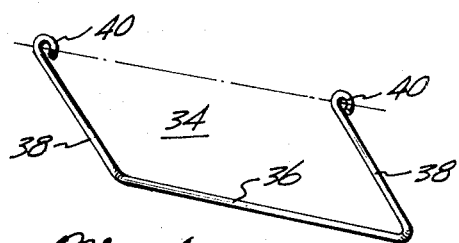
FIG. 4 shows a ramp bail.

The trap comprises the right rectangular cage including four panels hingedly joined together at their edges. These panels are bottom 10, top 12, and sides 14 and 16. Panels 10, 12, 14, and 16 are coextensive in length. Their adjoining edges are hingedly secured together by hog rings or clips 18 as shown illustratively in FIG. 3. The assembly of top, bottom, and side panels may be collapsed from the erect arrangement shown in FIG. 1 to a substantially co-planar arrangement by relative canting and collapsing movement of the panels in the manner indicated in FIG. 2.

Panels 10 and 12 are of the same width, but preferably wider than side panels 14,16. When erect, the panels define a right rectangular cage, somewhat wider than high, hAving an opposed pair of open ends or mouths.

A bridle, formed of strands of rope or the like 20 converging from the corners of top panel 12 toward the center, has an apex 22 to which is secured a hoisting line 24 extending upward to the water surface. Line 24 is used in placing and retrieving the trap.

Figure 1:
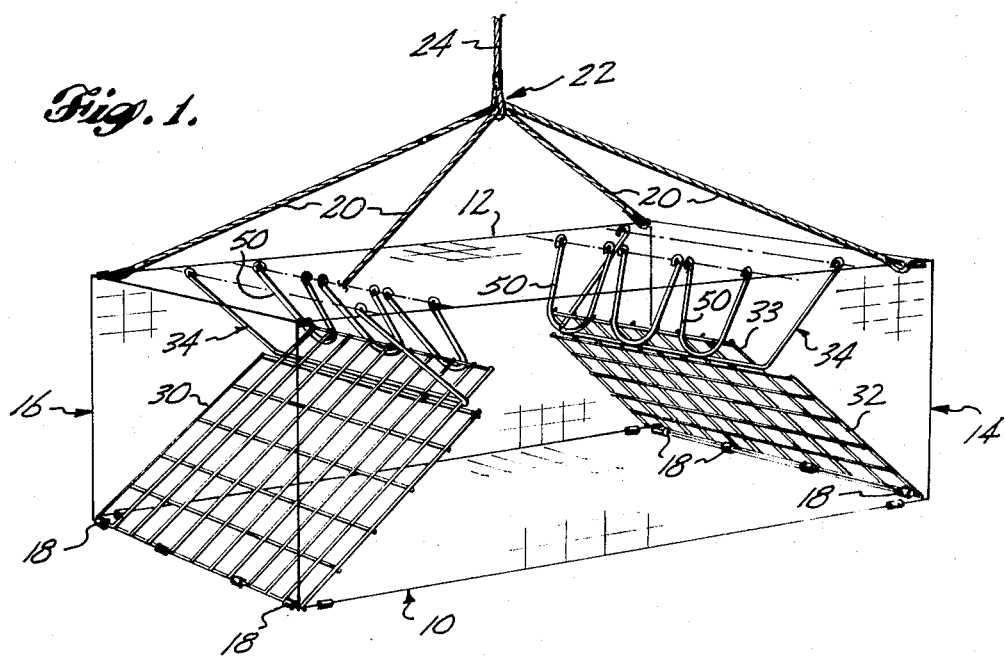
FIG. 1 is a perspective view according to a preferred embodiment of the present invention.

Ramp panels 30,32, longer than height of an end mouth, extend the width of bottom panel 10, and are adjacent the open end mouths of the cage. Panels 30,32 are hingedly joined by clips 18 to the bottom panel as best seen in FIG. 1. When the cage is not in use, the ramp panels are collapsed and lie on bottom panel 10. When the cage is erect, the ramp panels stand at an angle (desirably 45°) thereto inside each of the end openings of the cage. The ramp panels perform several functions. When the cage walls are erect, the inclined ramp panels 30,32 span between side panels 14,16, and align the cage sides parallel to each other. In this position, the ramp panels prevent canting of the cage walls and the collapse of the cage.

Preferably all panels and the ramps are formed of reticulated wire netting or screen which is structurally stiff and strong. A preferred form of screen has openings about 1 inch by 2 inches formed of 14 gauge steel wire, cross strands thereof being joined by conventional welding techniques.

Figure 6:
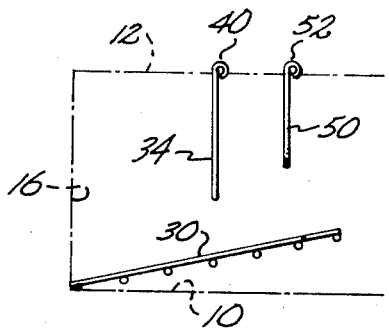
FIGS. 6, 7, and 8 show schematically the steps of raising a ramp panel.
Figure 7:
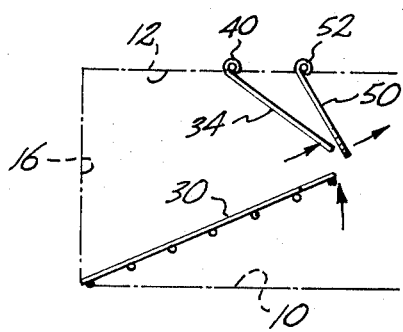
Figure 8:
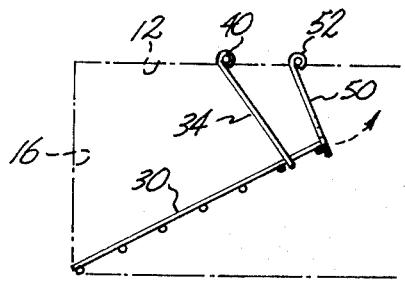

Ramp panels 30,32 are locked or suspended in their inclined position relative the top and bottom panels 10 and 12 by bails 34 as seen in FIG. 1. Each bail 34 comprises the cross bar 36 and legs 38 having eyes 40 on their ends. Bails are pivotally suspended from the underside of the top panel 12, eyes 40 being engaged around cross bars or wires thereof. Inner ends 31 and 33 of ramp panels 30,32 respectively, are slightly less wide than the full width of the ramp. This arrangement permits a ramp to be raised and then engaged between bail legs 38,38, and to come to rest upon a cross bar 36. This operation is best shown in FIGS. 6–8. With the cage erect, bail 34 hangs vertically. As the ramp 30 is raised, the bail 34 is swung inward (to the right as in FIG. 7), and the ramp raised until the ramp end 31 is higher than the bail cross bar 36. The bail is then released to swing back and under the ramp end. The ramp rests on the bail cross bar 36 as shown in FIG. 6 when the cage is erect, and the panels forming its walls are locked securely in position.

The upper surface of a ramp panel together with the inner surfaces of top, bottom, and side panels of the cage, defines a converging entry passage or throat that terminates within the cage with a restricted gullet forming between the upper end of the ramp panel and the adjacent inner surfaces of the top and side panels. This gullet, it will be seen, is located at the top of the cage and well above the bottom of the cage. As a crab enters one of the converging passages, he climbs the ramp until he reaches and passes through the gullet, whereupon he falls into the trap.

Traps of this nature are baited in various ways. A common practice is to introduce fish gurry into the cage, preferably in a perforated closed container. Alternatively and most practically, it has been found that a punctured can of cat food usually containing fish protein very effectively serves as trap bait.

Inside of the cage at each gullet is gate means so arranged that an entering crab displaces the gate. It is desireable that the gate means, after the passage of an entering crab, return to a position to block the gullet against the escape of the trapped crab. The preferred gate means is a series of U-shaped loops 50 having eyes 52 on the ends of the loop legs. The loops 52 are engaged over wire strands forming part of the top panel 12 and hang from the underside thereof. Preferably the gate loops are located somewhat inward from the pivot axis of the bail.

Referring to FIGS. 6–8 again, the inward location of loops 50 is such that as bail 34 is swung, during erection of the cage, (see FIG. 7) it contacts and raises the loops 50 sufficiently that the ramp end 31 may be raised to be engaged by the bail without interference from the loops. It will be observed that the pivot axis of loops 50 is outward of the upper end 31 of ramp panel 30. By this arrangement, the loops rest on the end of the ramp panel (see FIG. 8). In effect, loops 50 are gravity biased to their gullet-blocking positions. It is a practical impossibility for a crab trapped in the cage to escape so long as loops 50 remain as in FIG. 8. Desireably loops 50 are formed of wire and are covered by a plastic sheath 54 to reduce electrolysis, and increase their weight.

Figure 10:
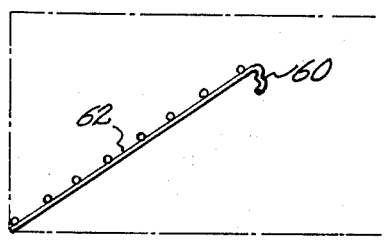
FIGS. 10 and 11 show alternative ramp retaining means.
Figure 11:
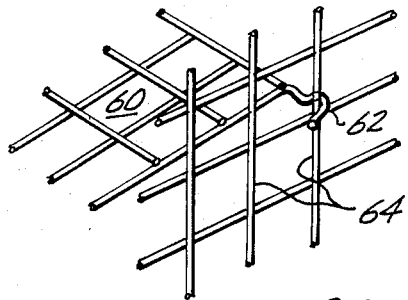

FIGS. 10 and 11 show alternative means for supporting the ramp panel in the desired inclined position. Hooks 60 are formed on the upper corners of the ramp panel 62 to stand out slightly to the side. When the ramp is raised, the cage side wall is sprung or bowed slightly outward, and a hook 60 is passed therethrough at a desired opening to latch the ramp panel to a bar in the side wall of the cage.

Figure 9:
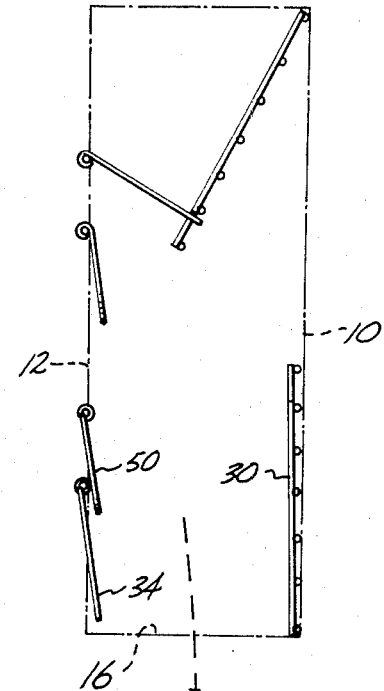
FIG. 9 illustrates a trap dumping operation.

When a trap is retrieved and found to contain crabs that have been trapped, it is easily emptied. The fishermen merely reach in one end of the cage and disengage the ramp 30 from the bail 34, swinging the ramp into close juxtaposition to the bottom panel 10. The trap is then upended as in FIG. 9. Bail 34 and loops 50 swing close to the inner surface of the top panel, and the trapped crab are simply dumped out of the open end of the cage.

While there has been disclosed herein a preferred form of the invention, it will be understood to those skilled in the art that variations, alternatives, and modifications may, without departing from the spirit of the invention, be adopted. It is intended that the subjoined claims be construed to cover not only this preferred embodiment of the invention, but all such variations as, by a reasonable application of the Doctrine of Equivalents, be determined to fall within this invention.

What is claimed is:

1. In a collapsible crab trap of the type including:
   a right rectangular open work cage including a bottom panel, a top panel thereover in spaced relation, and an erect side panel between both pairs of like side edges of said top and bottom panels, said cage having opposed open ends for the entry and removal of the crustaceans;
   said bottom, side and top panels being connected by hinge means permitting the lateral collapse of said cage in such manner that the top panel, the side panels, and the bottom panel may assume substantially co-planar relationship;
   the improvement, comprising:
   a flat rectangular ramp panel disposed inward of each open end of said cage, each said ramp panel having a width equal to the width of the bottom panel, and of the space between the side walls when erect relative the bottom;
   each ramp panel being hingedly coupled only to the adjacent end of said bottom panel and adapted for disposition co-planar with said bottom panel or inclined between the side panels of the erect cage, said ramp panels being operable when so inclined to support said side walls upright opposite each other and to define with said side walls and said top an opposed pair of converging entry passages or throats extending the full width of said cage upward and inward from the related open end toward the mid-portion of said cage; and
   pivotally suspended means depending from said top panel above each said ramp panel to engage and suspend the latter in its inclined disposition, the inner edge of each ramp panel being suspended spaced from the under side of the top panel of the cage to define the lower edge of an elevated and restricted gullet for said throat.

2. The structure according to claim 1 in which said pivotally suspended means slidably engages the ramp panels whereby upward pressure on a ramp panel from beneath tends to close the gullet associated therewith.

3. The structure according to claim 2 in which each said pivotally suspended means comprises a U-shaped bail which receives the sides of the inner end of the adjacent ramp panel and extends across the cage underneath said ramp panel.

4. The structure according to claim 3 in which the inner end of each ramp panel is notched at the corners and the associated bail is engaged in said notches and extends therebetween underneath the ramp panel.

* * * * *